Aug. 27, 1963  F. HELFERICH  3,101,550
SLIDE GAUGE
Filed Dec. 17, 1959  2 Sheets-Sheet 1

INVENTOR.
Fritz Helferich
BY

United States Patent Office 3,101,550
Patented Aug. 27, 1963

3,101,550
SLIDE GAUGE
Fritz Helferich, Schaan, Liechtenstein, assignor to Präzisions-Apparatebau Aktiengesellschaft, Vaduz, Liechtenstein, a company organized under the Swiss laws
Filed Dec. 17, 1959, Ser. No. 860,257
Claims priority, application Switzerland Oct. 31, 1959
5 Claims. (Cl. 33—143)

The present invention relates to a slide gauge in which a gauge body with a vernier scale is slidable in the known manner along a slide provided with divisions. Slide gauges are known in which the upper face of the slide is arranged in the same plane as the upper face of the gauge body. It is also known to arrange the side faces of the slide to form an angle of 60° so that the cross-section of the slide is hexagonal. In the manufacture of a slide from a single piece it is difficult to produce a guide for a slide with the proper play ensuring perfect movement of the gauge body, and to ensure that the upper face of the slide is perfectly flush with the upper face of the gauge body.

The above disadvantages are eliminated by the present invention which provides prismatic guides in the gauge body which are longitudinally and transversely adjustable, the guide surfaces of the prisms being inclined relative to the face of the slide. In a particularly advantageous embodiment of the invention, a spring is designed to engage the surface normal to the face of the slide for the purpose of clamping the gauge body, the said spring being forced against the surface by a screw inserted in the prismatic guide. The cross-section of the slide may be designed to form various profiles, e.g. an octagon.

Embodiments of the invention are represented in the attached drawing in which.

Figure 1:
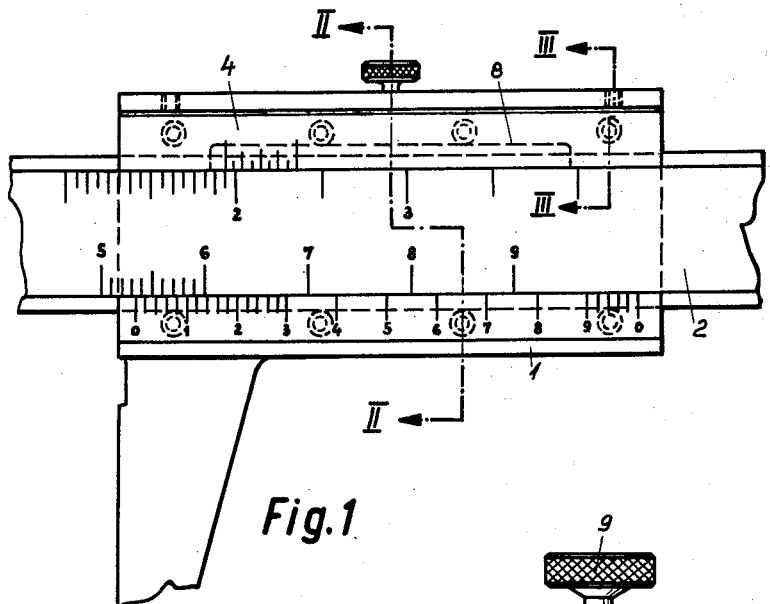
FIG. 1 is a plan view of the gauge body and a portion of a first embodiment of the slide.
Figure 3:
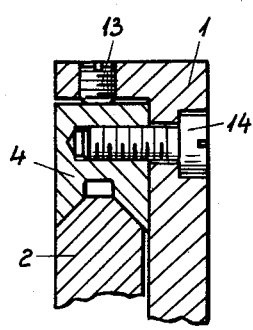
FIG. 3 is a cross-section of a portion of the gauge body along line III—III in FIG. 1, and FIGS. 4 through 7 show four different embodiments of the slide with the appropriate prismatic guides.
Figure 2:
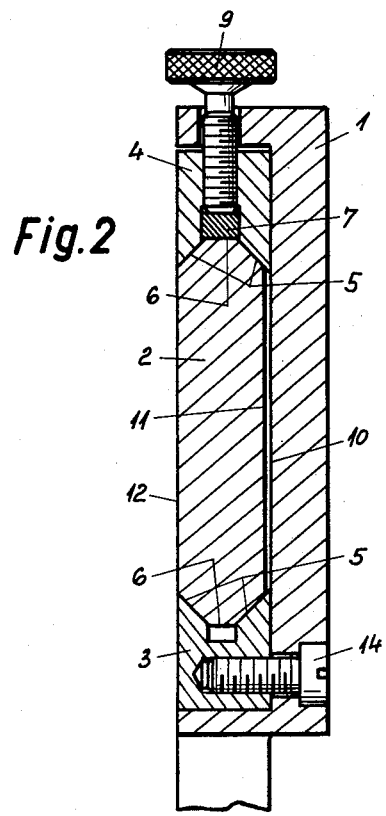
FIG. 2 is a cross-section of the gauge body and the slide along the line II—II in FIG. 1.

In FIGS. 1 through 3 representing a first embodiment, the gauge body is shown at 1 and the slide at 2, while the reference numerals 3 and 4 designate prismatic guides resting against the guide surfaces 5 of the slide 2. The cross-section of the slide 2 forms an octagon so that surfaces 6 are formed normally to the face of the slide 2 between the guide surfaces 5. A spring 7 is inserted in a recess 8 of the guide 4 between the guide surfaces 5. A spring 7 is inserted in a recess 8 of the prismatic guide 4 and can be forced in the known manner against the surface 6 of the slide 2 by means of a clamping screw 9. The prismatic guides 3 and 4 are so designed that the underface 11 of the slide 2 is kept at a distance from the basal surface 10 of the gauge body 1. The prismatic guides 3 and 4 engage the guide surfaces 5 in such a manner that the upper surfaces of the prismatic guides 3 and 4 are flush with the upper face 12 of the slide 2.

The prismatic guides 3 and 4 are arranged in the gauge body 1 so as to be longitudinally and transversely displaceable. The transverse position of the prismatic guides 3 and 4 is determined by the grub screws 13. The longitudinal displacement of the prismatic guides is limited by the play of the screws 14 in the gauge body 1. The screws 14 at the same time force the two prismatic guides against the basal surface 10 of the gauge body 1.

Provided on the upper face 12 of the slide 2 are one or several scales. Each adjacent upper face of the prismatic guides 3 and 4 has a vernier scale associated with the adjacent scale inscribed. To simplify reading, the surfaces of the slide and of the prismatic guides may be dulled by mechanical, chemical or electrical treatment. Tight engagement of the primatic guides with the slide enables the vernier-to-scale reading to be effected free from parallax.

Figure 4:
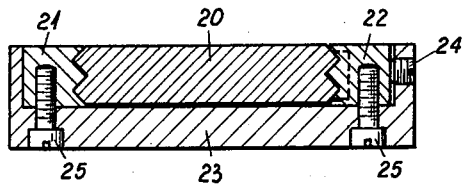
Figure 5:
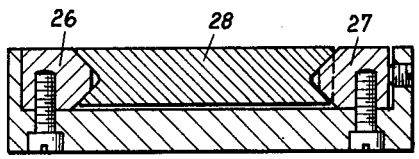
Figure 6:
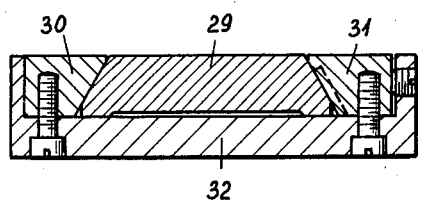
Figure 7:
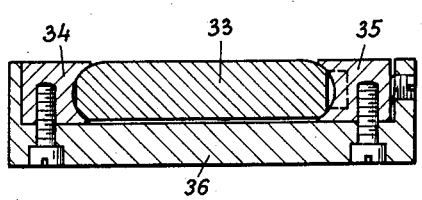

FIG. 4 shows an embodiment of a slide 20 in which the prisms 21 and 22 are provided with guide surfaces having a serrated cross-section. The gauge body 23 has a U-type cross-section as in FIGS. 1 through 3. The grub screw 24 is designed to effect transverse displacement and the cheese-head screws 25 for longitudinal displacement of the prisms 21 and 22. FIG. 5 is a variant of FIG. 4 with V-type prismatic guides 26 and 27. The slide 28 of this embodiment is provided with inwardly inclined guide surfaces. FIG. 6 shows an embodiment in which the slide 29 possesses a trapezoidal cross-section. The prisms 30 and 31 are arranged so as to be longitudinally and transversely displaceable in the gauge body 32, as in the previous embodiments. The variant of FIG. 7 shows a slide 33 of which the lateral surfaces have a semicircular cross-section. The prisms 34 and 35 are provided with corresponding guide surfaces and are again arranged in the gauge body 36 so as to be longitudinally and transversely displaceable.

In comparison with slide gauges of known design, the slide gauge according to the present invention provides the following advantages:

The prismatic guiding system is clearly superior to flat guides in respect of tight adjustment and good centering of the gauge body. The interior shape of the gauge body is more easily produced. The prismatic guides may be hardened and ground in a simple manner. The prismatic guides can be adjusted longitudinally so that savings in manufacture can be effected. When the measuring faces are worn, the prismatic guides can be adjusted to correct the divisions. The thickness of the slide is no longer a high-precision dimension. The prismatic guide may be adjusted transversely. The width of the gauge body therefore permits of greater tolerances in manufacture. The guide play of the slide can be adjusted in both directions. The arrangement enables savings to be made in manufacture and, when the guide surfaces are worn and some play occurs, adjustment to be made to re-establish a tight fit.

Having now particularly described and ascertained the nature of my said invention and the manner in which the same is to be performed, I declare that what I claim is:

1. A slide gauge comprising; a body having a central planar portion and parallel upstanding edge portions, a guide member extending along the body immediately inside each said edge portion, means extending through the body for adjustably clamping the guide members to the said body, each said guide member having prismatic guide surface means thereon on the side toward the other guide member, a slide member fitting between said guide members and having surfaces along its opposite edges which are complementary to and which engage the said guide surface means, said slide member being slidable in the direction of its length on said guide members, the guide members and slide member being coplanar with respect to the surfaces thereof facing outwardly away from said body, and cooperating scales on said slide member and guide members, the inner surface of said slide member facing the body being spaced from said central portion of the body for at least the larger part of the width of said slide member.

2. A slide gauge according to claim 1 in which the means clamping the guide members to the body comprises screws extending through the body from the back and into the guide members and providing for longitudinal adjustment of the guide members on the body, and abutment screws in at least one of said edge parts abutting the adjacent guide member on the side opposite the said slide member for adjustment of the guide members relatively toward and away from each other.

3. A slide gauge according to claim 2 in which said guide surfaces on the guide members and the complementary surfaces on the slide member are V-shaped and the slide member is so supported by said guide surfaces that its entire width is spaced from said central portion of the said body.

4. A slide gauge according to claim 2 in which said guide surfaces on the guide members and the complementary surfaces on the slide member are V-shaped, there being a leaf spring element in one of said guide members between the ends thereof substantially parallel to the slide member and engaging the slide member, and a screw threaded into the said one guide member and extending through a bore provided therefor in the adjacent said edge portion of the body for urging said spring toward said slide member.

5. A slide gauge according to claim 2 in which said guide surfaces on the guide members and the complementary surfaces on the slide member are V-shaped, there being a leaf spring element in one of said guide members between the ends thereof substantially parallel to the slide member and engaging the slide member, and a screw threaded into the said one guide member and extending through a bore provided therefor in the adjacent said edge portion of the body for urging said spring toward said slide member, said slide member having a surface thereon engaged by said spring and which surface is perpendicular to the said outer surface of the slide member.

References Cited in the file of this patent

UNITED STATES PATENTS

| | | |
|---|---|---|
| 651,142 | Keuffel | June 5, 1900 |
| 1,243,568 | Steczynski | Oct. 16, 1917 |
| 1,334,984 | Bourget | Mar. 30, 1920 |
| 1,341,865 | Solberg | June 1, 1920 |
| 1,554,176 | Becker | Sept. 15, 1925 |
| 2,368,344 | Caruso | Jan. 30, 1945 |
| 2,428,699 | Ebert et al. | Oct. 7, 1947 |
| 2,503,398 | Lindsey | Apr. 11, 1950 |
| 2,591,504 | Botts | Apr. 1, 1952 |

FOREIGN PATENTS

| | | |
|---|---|---|
| 102,499 | Great Britain | Nov. 27, 1917 |
| 97,086 | Switzerland | Dec. 1, 1922 |
| 253,042 | Switzerland | Oct. 16, 1948 |
| 618,547 | Great Britain | Feb. 23, 1949 |